(12) United States Patent  
French

(10) Patent No.: US 6,400,423 B1  
(45) Date of Patent: Jun. 4, 2002

(54) CHANNEL PLATES AND FLAT DISPLAY DEVICES INCORPORATING SUCH

(75) Inventor: Ian D. French, Hove (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/172,433

(22) Filed: Oct. 14, 1998

(30) Foreign Application Priority Data

Oct. 15, 1997 (GB) .............................................. 9721716

(51) Int. Cl.$^7$ ........................... G02F 1/133; H01J 17/49
(52) U.S. Cl. ......................................... 349/32; 313/582
(58) Field of Search ..................... 349/32; 313/582–584

(56) References Cited

U.S. PATENT DOCUMENTS 5,244,427 A  9/1993  Umeya ......................... 445/24
6,147,721 A * 11/2000  Tanaka et al. ................. 349/32

FOREIGN PATENT DOCUMENTS

WO   WO99/19766   *  4/1999

OTHER PUBLICATIONS

Buzak et al paper entitled "A 16–inch Full Colour Plasma Addressed Liquid Crystal Display", Digest of Tech. Papers, 1993 SID Int. Symp., Soc. for Info. Display, pp 883–886.
W. Liao et al paper enttitled "Novel low–temperature double passivation layer in hydrogenated amorphous silicon thin film transistors", Japanese Journal of Applied Physics, vol. 36, Apr. 1997, pp 2073–2076.

* cited by examiner

Primary Examiner—William L. Sikes
Assistant Examiner—Dung Nguyen

(57) ABSTRACT

A channel plate suitable for use in a plasma-addressed electro-optic display device and comprising a substrate having a set of elongate channels formed therein covered by a thin deposited dielectric layer is fabricated by filling the channels with filler material, depositing a layer of porous dielectric material over the substrate, removing the filler material from the channels through the porous layer and thereafter depositing a layer of non-porous dielectric material over the porous layer so as to close the channels. In this way a very thin dielectric layer can reliably be provided which improves operation of the channel plate as an addressing structure, with the channels filled with an ionisable gas, for example in a display device having electro-optic material overlying the dielectric layer.

9 Claims, 3 Drawing Sheets

CHANNEL PLATES AND FLAT DISPLAY DEVICES INCORPORATING SUCH

FIELD OF THE INVENTION

This invention relates to channel plates which comprise a dielectric substrate having a set of elongate channels therein and dielectric material extending over the surface of the substrate to cover the channels and which are suitable for use particularly, but not exclusively, in flat display devices such as plasma addressed electro-optic display devices, and to methods of making such.

BACKGROUND AND SUMMARY OF THE INVENTION

A known plasma addressed electro-optic display device using liquid crystal material and commonly referred to as a PALC display device typically comprises a sandwich of a first substrate having deposited on it parallel transparent column electrodes of ITO material and a colour filter layer; a second substrate comprising a channel plate having a set of parallel, sealed, plasma channels corresponding to rows of the display crossing all of the ITO columns and each of which is filled with a low pressure ionizable gas, such as helium, neon and/or argon, and containing spaced cathode and anode electrodes along the channel for ionizing the gas to create a plasma, which channels are closed off by a thin transparent dielectric sheet; and a liquid crystal (LC) material located between the substrates. The structure behaves like an active matrix liquid crystal display in which the thin film transistor switches at each pixel are replaced by a plasma channel acting as a row switch and capable of selectively addressing a row of LC pixel elements. In operation, successive lines of data signals representing an image to be displayed are sampled at column positions and the sampled data voltages are respectively applied to the ITO columns. All but one of the row plasma channels are in the de-ionized or non-conducting state. The plasma of the one ionized selected channel is conducting and, in effect, establishes a reference potential on the adjacent side of a row of pixels of the LC layer, causing each LC pixel to charge up to the applied column potential of the data signal. The ionized channel is turned off, isolating the LC pixel charge and storing the data voltage for a frame period. When the next row of data appears on the ITO columns, only the succeeding plasma channel row is ionized to store the data voltages in the succeeding row of LC pixels, and so on. As is well known, the attenuation of each LC pixel to backlight or incident light is a function of the stored voltage across the pixel. A more detailed description is Buzak et al., "A 16-inch Full Colour Plasma Addressed Liquid Crystal Display", Digest of Tech. Papers, 1993 SID Int. Symp., Soc. for Info, Displ. pp. 883–886.

A cross-section of the PALC display device described in the 1993 SID Digest is shown in FIG. 2. The thin dielectric sheet, referred to as the "micro-sheet", can be given a thickness in the range of 30–80 $\mu$m. From the mechanical point of view this makes the sheet rather fragile and difficult to handle in a production environment and special precautions have to be taken in the fabrication process of the panels. Breakage of the micro-sheet is a yield limiting factor. From the electrical point of view the micro-sheet is too thick because it has a large capacitance which necessitates high driving voltages.

There is proposed in U.S. Pat. No. 5,244,427 a channel plate for a PALC display device in which the conventional glass micro-sheet is dispensed with and a deposited layer of dielectric material is used instead to close and seal in gastight manner the channels. The proposed method of fabricating the plate involves etching or machining channels in a glass substrate which are subsequently filled with a heat-resisting high molecular material so as to form a flat surface. A film of transparent dielectric material such as glass or $SiO_2$ is then deposited. Thereafter the material filling the channels is dissolved and removed, presumably via the ends of the channels, leaving the deposited dielectric film in place which then serves the same function as the conventional glass micro-sheet. However, problems can be expected with this proposed method, particularly when used for large sized channel plates intended for large area display panels, in view of the difficulty in extracting efficiently and effectively the filler material from these channels, which may be for example around 1 metre in length but only around 300 $\mu$m in width.

It is an object of the present invention to provide an improved channel plate and method for making such which is suitable for use in panel display devices such as PALC display devices or other electronic array devices, utilising a similar form of channel plate.

It is another object of the present invention to provide a plasma addressed electro-optic display device which can be manufactured more reliably, with higher yield.

According to one aspect of the present invention there is provided a method of fabricating a channel plate comprising a dielectric substrate having a set of elongate channels therein covered by a layer of dielectric material, which method comprises providing a substrate having the set of channels formed therein, filling the channels with filler material, depositing a layer of dielectric material over the substrate so as to cover the filler material in the channels and removing the filler material from the channels, which is characterised in that after filling the channels with filler material a layer of porous dielectric material is deposited over the substrate, the filler material is removed from the channels at least partly through the deposited porous layer, and thereafter a layer of non-porous dielectric material is deposited over the layer of porous material so as to close the set of channels.

According to another aspect of the present invention there is provided a method of making a plasma addressed electro-optic display device comprising a layer of electro-optic material between a first substrate, having data electrodes, and a channel plate comprising a set of elongate plasma channels in a dielectric substrate which channels each comprise electrodes and an ionisable gas filling and are covered by a layer of dielectric material, which comprises the steps of fabricating the channel plate by the method according to the first aspect of the invention, filling the channels with an ionisable gas, assembling the channel plate and first substrate together with a space therebetween and introducing electro-optic material into said space.

According to a further aspect of the present invention a channel plate, suitable for use in a plasma addressed electro-optic display device, is provided which comprises a dielectric substrate having a set of elongate channels therein, a thin layer of deposited porous dielectric material extending over the surface of the substrate and covering the channels, and a thin layer of deposited non-porous dielectric material extending over the porous layer to seal off the channels.

The use of a porous dielectric layer deposited over the channels enables the filler material contained therein to be readily extracted more directly along the length of the channel so that problems caused by trying to remove the filler material from the ends of the channels as in the earlier proposed method are avoided. After forming the porous layer, the structure can be immersed in a bath of a suitably selective solvent or etchant which penetrates through the pores of this layer and dissolves the filler material, allowing the filler material to be removed readily through the pores and via the ends of the channels. Also, the presence of the porous layer in the finished channel plate means that some communication between adjacent channels in the plate is possible via this layer below the non-porous layer rather that the channels being individually sealed. Thus, after the channels are filled with an ionisable gas and during subsequent use, equalisation of gas pressure in the set of channels can occur. Also the gas can be introduced into just one channel rather than all channels separately.

The filler material preferably comprises a polymer. Preferably, a liquid polymer material is applied over the substrate, by spin coating or printing, and then heat treated to form a polymerised film, the heat treatment serving to promote reflow so as to planarise this layer. A plasma etching or ashing process can then be used to etch the polymer layer until substantially level with the top of the channels so as to facilitate the deposition of a planar and uniform thickness porous layer.

The channels may be formed in the surface of the substrate, preferably of glass, by any suitable technique such as etching or mechanical grinding. Alternatively the substrate with the channels may be formed from a plate of glass on whose surface strips of dielectric material may be provided to form channel walls, each channel being defined by the facing sides of an adjacent pair of strips and the intervening surface region of the glass plate.

The deposited porous dielectric layer and overlying non-porous dielectric layer can be of various materials which are capable of being deposited in the desired manner and which offer appropriate properties, for example dielectric constant, but silicon oxide, silicon nitride and tantalum dioxide are particularly preferred. When using such materials, the non-porous layer can be deposited by sputtering, chemical vapour deposition (CVD), plasma enhanced CVD (PECVD) or ECR (electron cyclotron resonance, a form of PECVD), at a relatively low temperature, for example around 200° C. or lower, and the porous layer is preferably deposited by a similar process to a thickness of between preferably 50 to 500 nm. The thickness and type of each layer is selected having regard to the desired electrical characteristics i.e. capacitance and resistance, and structural characteristics, i.e. mechanical integrity. In the case of the plate being used in a PALC display device, the deposited dielectric material must serve to seal the channels, to contain the ionisable gas filling therein, and the region containing the liquid crystal material, and therefore the nature of the non-porous deposited layer must be such that it is impermeable to both the ionisable gas and liquid crystal. With this in mind, and taking into account also the electrical characteristics required from the combined dielectric layers when in use as an addressing structure, the overall thickness of the two, porous and non-porous, layers may be in the range of 0.5 to 20 $\mu$m, which is considerably thinner than the conventionally used glass micro-sheet.

Although the invention is applicable especially to plasma-addressed electro-optic display devices it is envisaged that the channel plate could be used as an addressing structure in different kinds of flat display devices and other electronic array devices, such as memory devices, particularly when the addressing structure incorporates an ionisable gas.

Embodiments of channel plates, plasma-addressed electro-optic display devices incorporating such, and their methods of manufacture, in accordance with the present invention will now be described, by way of example, with reference to the accompanying drawings in which:

Figure 1:
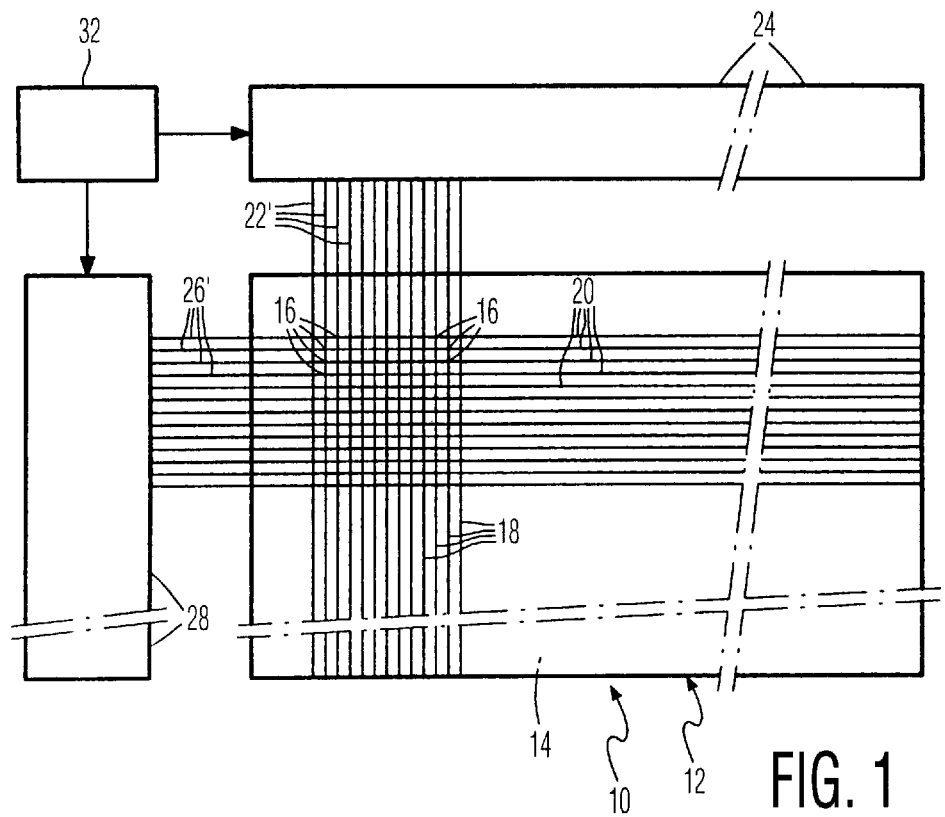
FIG. 1 is a schematic block diagram of a known flat panel display system.

It should be understood that the figures are merely schematic and are not drawn to scale. In particular certain dimensions such as the thickness of layers or regions may have been exaggerated whilst other dimensions may have been reduced. The same reference numerals are used throughout the figures to indicate the same or similar parts.

DESCRIPTION OF THE PREFERRED EMBODIMENTS

Referring to FIG. 1, there is shown a flat panel display system 10, which represents a typical PALC display device and the associated operating electronic circuitry. The flat panel display system comprises a display panel 12 having a display area 14 that contains a pattern formed by a row and column planar array of nominally identical data storage or display elements 16 mutually spaced apart by predetermined distances in the vertical and horizontal directions. Each display element 16 in the array represents the overlapping portions of thin, narrow electrodes 18, referred to hereinafter as column electrodes, arranged parallel in vertical columns and elongate, narrow channels 20 arranged parallel in horizontal rows. The display elements 16 in each of the rows of channels 20 represent one line of data.

Figure 2:
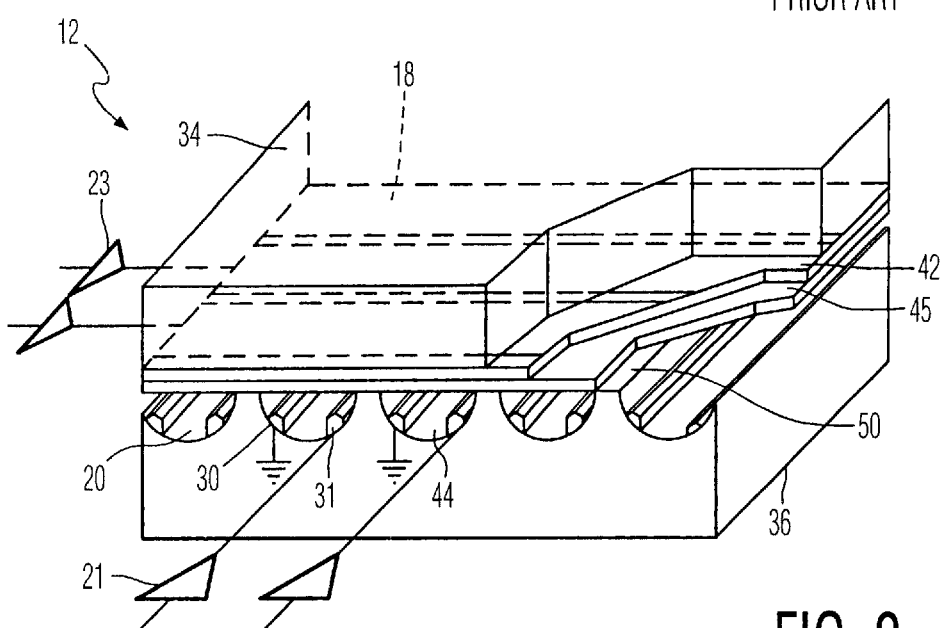
FIG. 2 is a perspective schematic view of part of a conventional PALC display device.

Referring also to FIG. 2, the widths of column electrodes 18 and channels 20 determine the dimensions of the display elements 16, or pixels, which are typically of rectangular shape. The column electrodes 18, of ITO material, are deposited on a major surface of a first electrically insulating, optically transparent substrate 34, and the channel rows are usually built into a second transparent substrate 36. Skilled persons will appreciate that certain systems, such as a reflective display of either the direct view or projection type, would require that only one substrate be optically transparent.

The column electrodes 18 receive data drive signals of the analog voltage type developed on parallel output conductors 22' by different ones of output amplifiers 23 (FIG. 2) of a data driver or drive circuit 24, and the channels 20 receive data strobe signals of the voltage pulse type developed on parallel output conductors 26' by different ones of output amplifiers 21 (FIG. 2) of a data strobe or strobe means or strobe circuit 28. Each of the channels 20 includes a reference electrode 30 (FIG. 2) to which a reference potential, such as ground, common to each channel 20 and data strobe 28 is applied.

To synthesize an image on the entire area of display surface 14, the display system 10 employs a scan control circuit 32 that coordinates the functions of the data driver 24 and the data strobe 28 so that all columns of display elements 16 of the display panel 12 are addressed row by row in row scan fashion as has been described. The display panel 12 may employ electro-optic materials of different types. For example, if it uses such material that changes the polarization state of incident light rays, display panel 12 is positioned between a pair of light polarizing filters, which cooperate with display panel 12 to change the luminance of light propagating through them. The use of a scattering liquid crystal cell as the electro-optic material would not require the use of polarizing filters, however. All such materials or layers of materials which attenuate transmitted or reflected light in response to the voltage across it are referred to herein as electro-optic materials. As LC materials are presently the most common example, the detailed description will refer to LC materials but it will be understood that the invention is not limited thereto. A colour filter (not shown) may be positioned within display panel 12 to develop multi-coloured images of controllable colour intensity. For a projection display, colour can also be achieved by using three separate monochrome panels 12, each of which controls one primary colour.

FIG. 2 illustrates the PALC version of such a flat display panel using LC material. Only 3 of the column electrodes 18 are shown in this part view. The row electrodes 20 are constituted by a plurality of parallel elongated sealed channels underlying a layer 42 of the LC material. Each of the channels 20 is filled with an ionizable gas 44, closed off and sealed by a thin dielectric sheet 45 typically of glass, and contains on an interior channel surface first and second spaced elongated electrodes 30, 31 which extend the full length of each channel. The first electrode 30 is grounded and is commonly called the cathode. The second electrode 31 is referred to as the anode, since it is supplied relative to the cathode electrode with a positive strobe pulse sufficient to cause electrons to be emitted from the cathode 30 to ionize the gas. As explained above, each channel 20, in turn, has its gas ionized with a strobe pulse to form a plasma and a grounded line connection to a row of pixels in the LC layer 42 above. When the strobe pulse terminates, and after deionization has occurred, the next channel is strobed and turned on. Since the column electrodes 18 each cover a whole column of pixels, only one plasma row connection at a time is allowed on to avoid crosstalk.

Fabrication of a PALC device is typically accomplished as described in the aforementioned 1993 SID digest paper by providing first and second substrates 34, 36 with the first substrate 34 comprising a glass panel on which the ITO column electrodes 18 are vapour deposited, followed by colour filter processing over the ITO electrodes to produce the RGB stripes (not shown), followed by the black surround processing and liquid crystal alignment processing. The second substrate 36, also a glass panel, is masked and etched to form the set of channels 20, following which the plasma electrode material is deposited and masked and etched to form the cathode 30 and anode 31 electrodes. A thin dielectric glass microsheet 45 is then sealed across the channel ridges 50, or mesas, to seal off the channels 20, which are then exhausted, back-filled with low-pressure ionizable gas such as helium and/or neon and optionally with a small percentage of argon and sealed off at their ends. The structure comprising the substrate 36 and the bonded dielectric microsheet is referred to as the channel plate. LC alignment of the exposed surface of the microsheet 45 is then carried out. The two assembled substrates are then assembled into a panel with the two LC alignment surfaces spaced apart and facing, the LC material 42 introduced into the space, and electrical connections made to the column electrodes 18 and plasma electrodes 30, 31.

In the present invention, the thin glass micro-sheet 45 is dispensed with and instead a thin transparent dielectric layer is formed in situ over the surface of the substrate 36 by deposition to cover, and seal off, the channels 20. The manner in which this is achieved will now be described with reference to FIGS. 3 to 7 which illustrate the channel plate at various stages in its fabrication.

Figure 3:
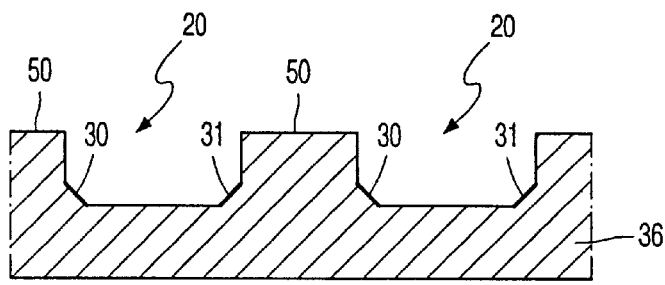
FIGS. 3 to 7 illustrate various stages in the fabrication of a channel plate for use in a plasma addressed display device according to the present invention.

Referring to FIG. 3, a glass plate constituting the substrate 36 and of suitable thickness to provide the required structural integrity for the channel plate is etched so as to form the set of parallel and regularly-spaced channels 20 in one major surface of the plate. Techniques other than etching, for example micro-machining, may be used instead to form the channels. The channels shown in FIG. 3 are in the form of generally rectangular grooves having flat side and bottom surfaces. However, the channel profile can be varied as required and for example, may be semi-cylindrical as shown in FIG. 2. The channelled substrate may instead be formed by providing spaced strips or ribs of dielectric material on the major surface of a glass plate in known manner which serve as partitions, like the mesa regions 50, such that each channel is constituted by the opposing sides, which may be substantially vertical or sloping, of a pair of adjacent strips and the region of the surface of the glass plate between the strips. Typically, the channels may be around 20–30 $\mu$m deep and 300 $\mu$m across. Their length, determined by the size of the display area 14 required, may be around 1 metre.

The spaced anode and cathode electrodes 30 and 31 are provided in each channel in known manner by depositing electrode material and patterning the deposited material photo-lithographically.

Figure 4:
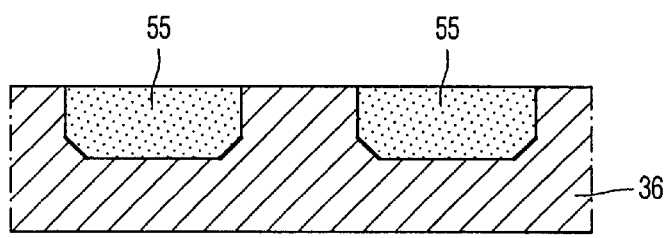

A liquid polymer film is then applied over the substrate by spin coating or printing so as to fill completely the channels 20. A heat treatment is used to remove the solvent, polymerise the film and promote reflow to planarise the polymer layer. A plasma etching or ashing process can be used to etch the polymer layer down such that it is level with the top surface of the mesas 50 of the glass substrate and a continuous, planar surface is obtained as shown in FIG. 4 in which the remaining polymer material filling the channels is indicated at 55. A preferred example of polymer used for this purpose is polyimide. Spin-on-glasses may be used instead.

Figure 5:
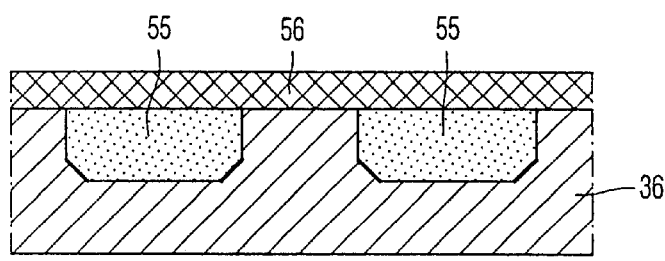

Thereafter, and as shown in FIG. 5, a continuous layer of porous dielectric material 56 is deposited over the planar surface, to a predetermined, uniform, thickness. The material may be silicon oxide, silicon nitride, or tantalum dioxide which is deposited at a relatively low temperature to a thickness of between 50 to 500 nm by sputtering, evaporation, CVD, PECVD or ECR. Any other dielectric material having good dielectric properties which is compatible and can be deposited to form a substantially uniform and adequately thin porous layer that bonds effectively to the glass material of the substrate could be used. The fabrication of thin layers of materials such as amorphous silicon nitride by PECVD at relatively low temperatures, for example around 150° C. or less, is known to result in a porous structure being obtained. One possible way of forming a layer which has increased porosity is to deposit silicon nitride in an aminosilane regime at a relatively low temperature (less than 200° C.) such that an aminosilane network is obtained. This material will then oxidise in air to produce highly porous $SiO_2$, typically in less than one day. The ability of amorphous silicon thin films formed using PECVD at comparatively low temperatures to become more highly porous through oxidation is known. The effect is described for example in the paper by W. Liao et al entitled "Novel low-temperature double passivation layer in hydrogenated amorphous silicon thin film transistors" published in the Japanese Journal of Applied Physics, Vol. 36 April 1997, at pages 2073–6.

Figure 6:
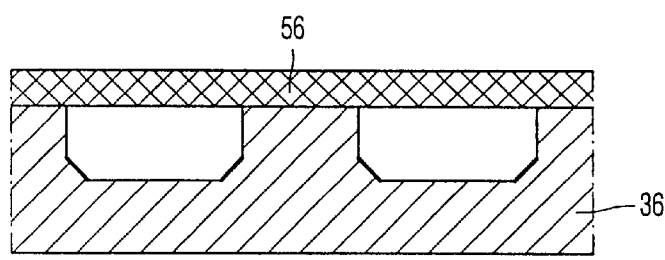

The polymer filler material 55 in the channels is then dissolved through the pores of the dielectric layer 56. To this end the structure is immersed in a bath of suitable solvent or etchant which penetrates through pores in the layer 56, and also from the channel ends, and dissolves the polymer filler material 55. The dissolving agent used is selected so as to attack only the polymer material without harming the glass substrate 36, the electrodes 30 and 31 or the dielectric layer 56. Agents suitable for use with the aforementioned dielectric materials would include fuming nitric acid, acetone and KOH. After completing this filler removal process and washing the channels, a structure as shown in FIG. 6 is obtained.

Figure 7:
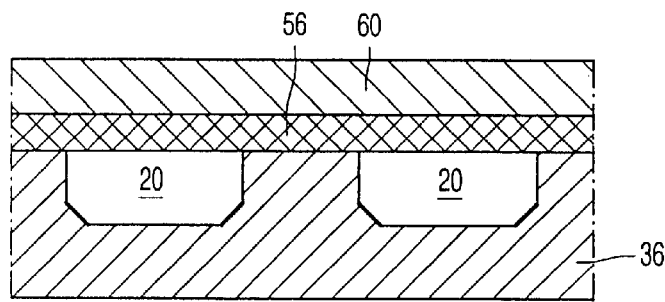

A further layer of dielectric material 60 is then deposited completely and continuously over the porous layer 56 to a uniform thickness so as to form the structure shown in FIG. 7. The layer 60 is a solid, non-porous, layer which closes off, and seals in gas light manner, the channels 20. The material used for this layer 60 can again comprise silicon oxide, silicon nitride or tantalum dioxide as used for the porous layer 56 which is preferably deposited by a PECVD process. As with the layer 56, other materials having good dielectric properties could be used. The non-porosity of this layer is obtained by varying the deposition parameters as will be apparent to persons skilled in the art. Although some pores of the porous layer 56 at the surface region may be filled by material of the second deposited layer, it does not penetrate through the layer 56. Intercommunication between the channels in the completed structure is thus provided via the porous layer underlying the non-porous layer at the channel ridges 50. At the periphery of the plate 36, the porous layer 56 terminates slightly inwardly of the edges of the upper surface of the plate and the non-porous layer 60 is arranged to extend completely over the layer 56 and directly onto the exposed peripheral border region of the upper surface of the plate 36 so as to provide a seal around the porous layer 56.

The thickness of the layer 60 is controlled such that the combined thicknesses of the layers 56 and 60, which together constitute a thin dielectric microsheet 45, is around 0.5 to 20 $\mu$m. The actual thickness of the combined layers is selected so as to provide optimal electrical characteristics (capacitance and resistance) when in operational use of the channel plate as a plasma addressing structure in the PALC display device, whilst also providing adequate structural characteristics such as mechanical integrity, with the thickness of the layer 60 also be selected so as to ensure impermeability to, on the one hand, the ionisable gas within the channels, and on the other hand the liquid crystal material overlying the outer surface of the layer 60. A channel plate is thus obtained in which the thin deposited porous layer extends directly over the substrate surface and covers the channels formed therein and the thin deposited non-porous layer extends directly over the porous layer to seal the channels.

As the layers 56 and 60 effectively constitute a dielectric microsheet and are formed in situ directly on the glass substrate 36 the difficulties caused by the need to handle a separately formed microsheet, as is the case of the conventional structure using a glass microsheet, are avoided as is also the need for a bonding stage using, for example, a frit seal.

Figure 8:
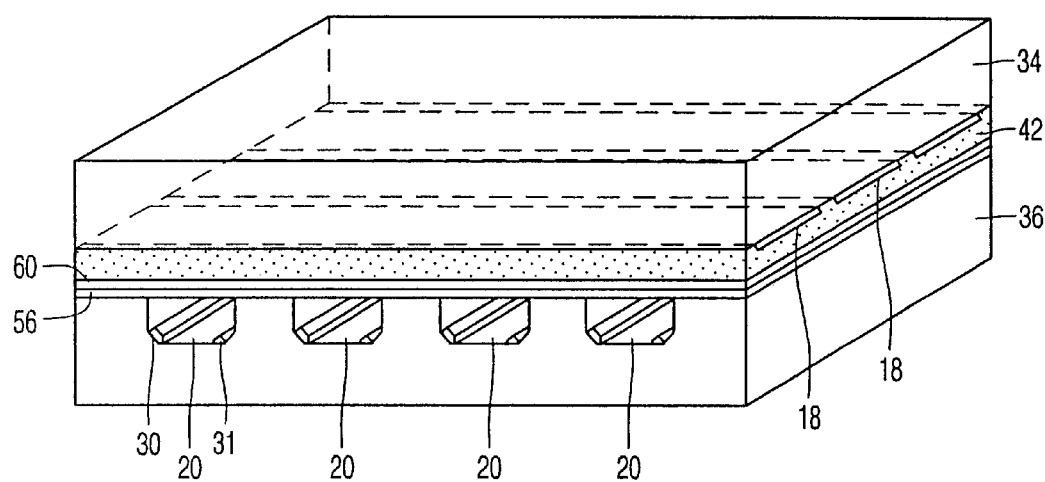
FIG. 8 is a schematic perspective view of part of a PALC display device using the channel plate.

If twisted nematic type LC material is used, the layer 60 may be treated, for example by rubbing, following its formation to provide an LC alignment surface. Alternatively, a separate layer of polyimide providing such a surface may be deposited over the layer 60. The channels 20 may be exhausted via their ends, filled with the ionisable gas and sealed at their ends in conventional manner to complete the channel plate. Alternatively, because the channels intercommunicate, the gas can be introduced at one end of one channel, all other ends of the channels having been sealed off beforehand, and this one end sealed after filling the channels. The completed channel plate is then assembled together with the substrate 34 to form the completed display panel, as shown in FIG. 8.

It will be appreciated that various modifications in the above-described embodiment are possible. For example, while the channels of the substrate would typically be straight, other channel shapes, such as a meandering shape, are also possible.

In the case of the display device being for example of the reflection type and transparency of the substrate 36 is therefore not required, the dielectric layers 56 and 60 need not necessarily be of transparent material.

From reading the present disclosure, other modifications will be apparent to persons skilled in the art. Such modifications may involve other features which are already known in the field of channel plates and flat display device utilising such and component parts thereof and which may be used instead of or in addition to features already described herein.

What is claimed is:

1. A method of fabricating a channel plate comprising a dielectric substrate having a set of elongate channels therein covered by a layer of dielectric material, which method comprises providing a substrate having the set of channels formed therein, filling the channels with filler material, depositing a layer of dielectric material over the substrate so as to cover the filler material in the channels and removing the filler material from the channels, which is characterised in that after filling the channels with filler material a layer of porous dielectric material is deposited over the substrate, the filler material is removed from the channels at least partly through the deposited porous layer, and thereafter a layer of non-porous dielectric material is deposited over the layer of porous material so as to close the set of channels.

2. A method of fabricating a channel plate according to claim 1, characterised in that the filler material comprises a polymer material which is applied over the substrate as a liquid polymer and then subjected to a heat treatment to promote reflow and planarisation of the polymer material.

3. A method of fabricating a channel plate according to claim 1 or claim 2, characterised in that the porous and non-porous layers comprise silicon oxide, silicon nitride or tantalum dioxide.

4. A method of fabricating a channel plate according to claims 1, characterised in that the porous dielectric layer is deposited to a thickness of between 50 nm to 500 nm.

5. A method of fabricating a channel plate according to claim 4, characterised in that the non-porous dielectric layer is deposited to a thickness such that the combined thickness of the porous and non-porous dielectric layers is between 0.5 $\mu$m and 20 $\mu$m.

6. A method of making a plasma addressed electro-optic display device comprising a layer of electro-optic material between a first substrate, having data electrodes, and a channel plate comprising a set of elongate plasma channels in a dielectric substrate which channels each comprise electrodes and an ionisable gas filling and are covered by a layer of dielectric material, which comprises the steps of fabricating the channel plate by the method according to any one of the preceding claims, filling the channels with an ionisable gas, assembling the channel plate and first substrate together with a space therebetween and introducing electro-optic material into said space.

7. A channel plate comprising a dielectric substrate having a set of elongate channels therein and a layer of deposited non-porous dielectric material provided over the substrate and covering the channels, characterised in that the non-porous dielectric layer overlies a layer of porous dielectric material extending over the substrate and the channels therein.

8. A channel plate according to claim 7, characterised in that the combined thickness of the porous and non-porous dielectric layers is between 0.5 $\mu$m and 20 $\mu$m.

9. A channel plate according to claim 7, characterised in that the channels are filled with an ionisable gas which is contained by the non-porous layer.

* * * * *